(12) United States Patent
Wu et al.

(10) Patent No.: US 8,922,802 B2
(45) Date of Patent: Dec. 30, 2014

(54) METHOD AND SYSTEM FOR HALFTONING USING ENERGY MINIMIZATION

(71) Applicants: Chai Wah Wu, Hopewell Junction, NY (US); Barry M. Trager, Yorktown Heights, NY (US); Mikel J. Stanich, Longmont, CO (US); Kartheek Chandu, Longmont, CO (US)

(72) Inventors: Chai Wah Wu, Hopewell Junction, NY (US); Barry M. Trager, Yorktown Heights, NY (US); Mikel J. Stanich, Longmont, CO (US); Kartheek Chandu, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 51 days.

(21) Appl. No.: 13/773,017

(22) Filed: Feb. 21, 2013

(65) Prior Publication Data
US 2014/0233069 A1 Aug. 21, 2014

(51) Int. Cl.
G06F 3/12 (2006.01)
G06K 15/02 (2006.01)

(52) U.S. Cl.
CPC .................................. G06K 15/1881 (2013.01)
USPC ........ 358/1.13; 358/3.17; 358/3.18; 358/3.26; 358/533; 358/534

(58) Field of Classification Search
CPC ..................................................... G06F 2217/82
USPC ............................................... 358/3.06–3.19
See application file for complete search history.

(56) References Cited

U.S. PATENT DOCUMENTS

| 6,114,071 A * | 9/2000 | Chen et al. ......................... 430/5 |
| 6,724,501 B2 | 4/2004 | Atkins et al. |
| 6,867,884 B1 * | 3/2005 | Rozzi .............................. 358/1.9 |
| 6,870,644 B2 | 3/2005 | Schramm et al. |
| 7,924,465 B2 | 4/2011 | Ike et al. |
| 7,933,044 B2 | 4/2011 | Wang |
| 7,961,962 B2 | 6/2011 | Cittadini et al. |
| 2002/0196454 A1 * | 12/2002 | Atkins et al. ................... 358/1.9 |
| 2003/0107768 A1 | 6/2003 | Crounse |
| 2008/0316462 A1 * | 12/2008 | Riel et al. ........................... 356/3 |
| 2013/0315462 A1 * | 11/2013 | Wachinger et al. ............ 382/131 |
| 2014/0093146 A1 * | 4/2014 | Inanc et al. ..................... 382/125 |
| 2014/0142377 A1 * | 5/2014 | Yang et al. ..................... 600/104 |

FOREIGN PATENT DOCUMENTS

EP 0661869 7/1995

OTHER PUBLICATIONS

Wu, Chai Wah, "A Sensor Placement Algorithm for Redundant Covering Based on Riesz Energy Minimization"., 2008, pp. 2074-2077.*
Fan, Z. , "Retrieval of Gray Images from Digital Halftones", (1992), 2477-2480.
Hong, D. , et al., "A Serpentine Error Diffusion Kernel with Threshold Modulation for Homogeneous Dot Distribution", (1999), 1.
Wu, Chai Wah , "A Sensor Placement Algorithm for Redundant Covering Based on Riesz Energy Minimization", (2008), 2074-2077.

* cited by examiner

Primary Examiner — Benny Q Tieu
Assistant Examiner — Marcellus Augustin
(74) Attorney, Agent, or Firm — Blakely, Sokoloff, Taylor & Zafman LLP

(57) ABSTRACT

A method is disclosed. The method includes generating a set of points via energy minimization to implement halftone seed pattern.

15 Claims, 6 Drawing Sheets

METHOD AND SYSTEM FOR HALFTONING USING ENERGY MINIMIZATION

FIELD OF THE INVENTION

The invention relates to the field of image reproduction, and in particular, to digital halftoning.

BACKGROUND

Digital halftoning is a technique for displaying a picture on a two-dimensional medium, in which small dots and a limited number of colors are used. The picture appears to consist of many colors when viewed from a proper distance. For example, a picture consisting of black and white dots can appear to display various gray levels.

Typically, an initial seed pattern is provided to generate a halftone mask, with several conventional methods currently being used. For example, a known method is to find a pattern based on blue noise. However, the blue noise method has limitations in that a stochastic blue noise pattern generated by prior art algorithms may not produce uniformly distributed patterns. Similarly, the other known seed pattern generation methods have limitations.

Accordingly, an improved method for generating a seed pattern is desired.

SUMMARY

In one embodiment, a method is disclosed. The method includes generating a set of points via energy minimization to implement halftone seed pattern.

BRIEF DESCRIPTION OF THE DRAWINGS

A better understanding of the present invention can be obtained from the following detailed description in conjunction with the following drawings, in which.

DETAILED DESCRIPTION

A method for generating a halftone seed pattern is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
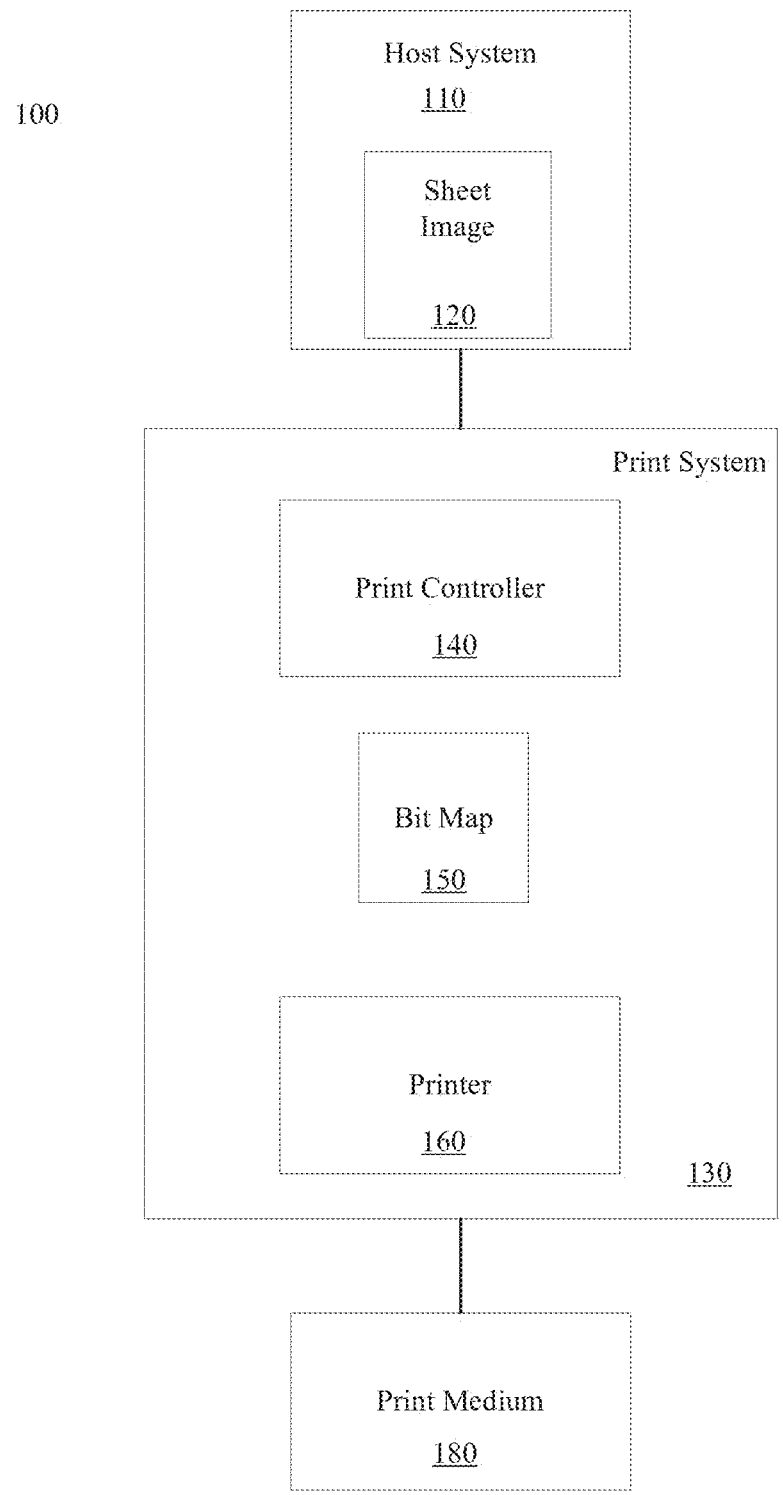
FIG. 1 illustrates one embodiment of a printing network.

FIG. 1 is a block diagram illustrating a printing network 100. Network 100 includes a host system 110 in communication with a printing system 130 to print a sheet image 120 onto a print medium 180 (e.g., paper) via a printer 160. The resulting print medium 180 may be printed in color and/or in any of a number of gray shades, including black and white.

Host system 110 may include any computing device, such as a personal computer, a server, or even a digital imaging device, such as a digital camera or a scanner. The sheet image 120 may be any file or data that describes how an image on a sheet of print medium should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160.

The printing system 130 may be a high-speed printer operable to print relatively high volumes (e.g., greater than 100 pages per minute). The print medium 180 may be continuous form paper, cut sheet paper, and/or any other tangible medium suitable for printing. In one embodiment, the printing system 130 includes the printer 160 that presents the bitmap 150 onto the print medium 180 (e.g., via toner, ink, etc.) based on the sheet image 120.

Figure 2:
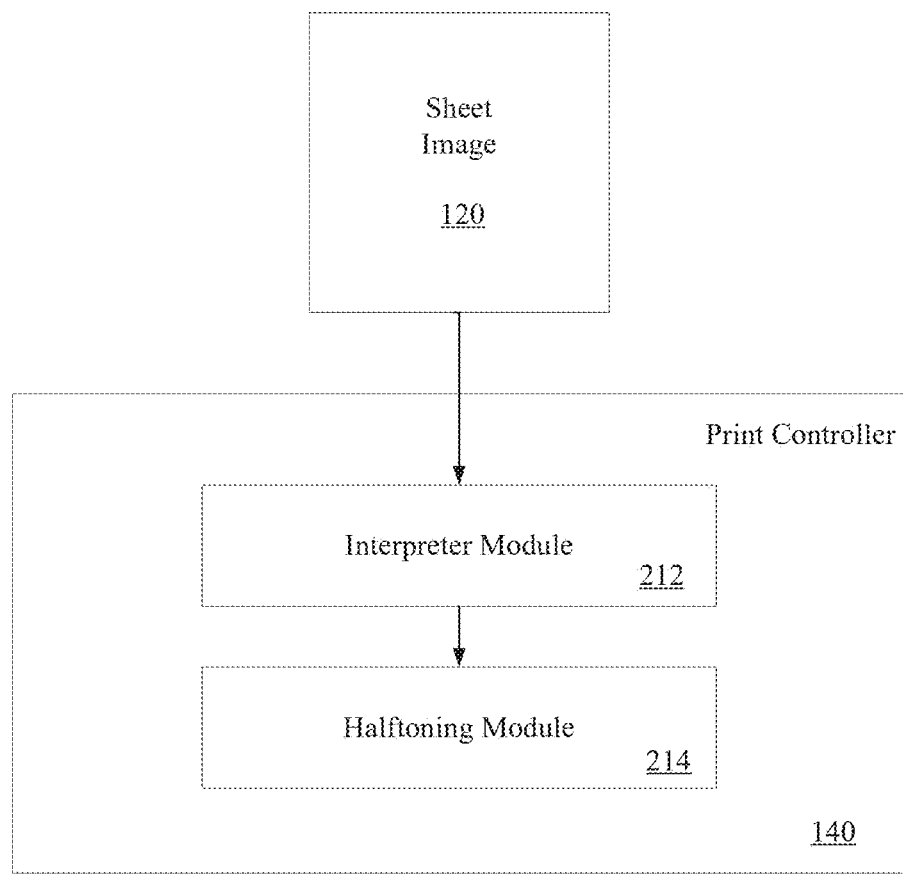
FIG. 2 illustrates one embodiment of a print controller.

The print controller 140 may be any system, device, software, circuitry and/or other suitable component operable to transform the sheet image 120 for generating the bitmap 150 in accordance with printing onto the print medium 180. FIG. 2 is a block diagram illustrating an exemplary print controller 140.

Referring to FIG. 2, the print controller 140, in its generalized form, includes an interpreter module 212 and a halftoning module 214. In one embodiment, these separate components represent hardware used to implement the print controller 102. Alternatively or additionally, the components may represent logical blocks implemented by executing software instructions in a processor of the printer controller 140. Accordingly, the invention is not intended to be limited to any particular implementation as such may be a matter of design choice.

The interpreter module 212 is operable to interpret, render, rasterize, or otherwise convert images (i.e., raw sheetside images such as sheet image 120) of a print job into sheetside bitmaps. Assuming a monochrome printer, the sheetside bitmaps generated by the interpreter module 212 are each two-dimensional array of pixels representing an image of the print job (e.g., a continuous tone image (CTI)), also referred to as full sheetside bitmaps.

The two-dimensional pixel arrays are considered "full" sheetside bitmaps because the bitmaps include the entire set of pixels for the image. The interpreter module 212 is operable to interpret or render multiple raw sheetsides concurrently so that the rate of rendering substantially matches the rate of imaging of production print engines.

Halftoning module 214 is operable to represent the sheetside bitmaps as patterns of ink drops or other dots, having one or more different drop of dot sizes. For example, the halftoning module 214 may convert the continuous tone sheetside bitmaps to a pattern of ink drops for application to the print medium 180 (e.g., paper). Once computed, the halftoning module 214 transfers the converted sheetside bitmaps to the print head controllers of the printer 160 to apply the ink drop(s) to the tangible medium 180.

In one embodiment, the optimized halftone design is saved in halftoning module 214 where it remains resident. The resident pattern is employed by the module to perform the halftoning operation on the sheet image 120. For example the resident halftone may be a threshold array (TA) which is employed to perform the halftoning operation.

Where the threshold array is generated based on the seed pattern generation method described in this patent. Threshold arrays are used to represent point operation halftones where the local PEL decision is made by comparison between the contone image data and threshold array values at each point of the array.

The TA is tiled across the sheetmap image without any offset to facilitate comparing all of the data since the sheetmap image is typically larger than the TA. The converted sheetside data resulting from the comparison forms the output data which is passed to the print engine. In the case of multibit halftones multiple TA arrays having non overlapping threshold values at each PEL may be employed to determine the multibit drop selections sent to the printer.

Figure 3:
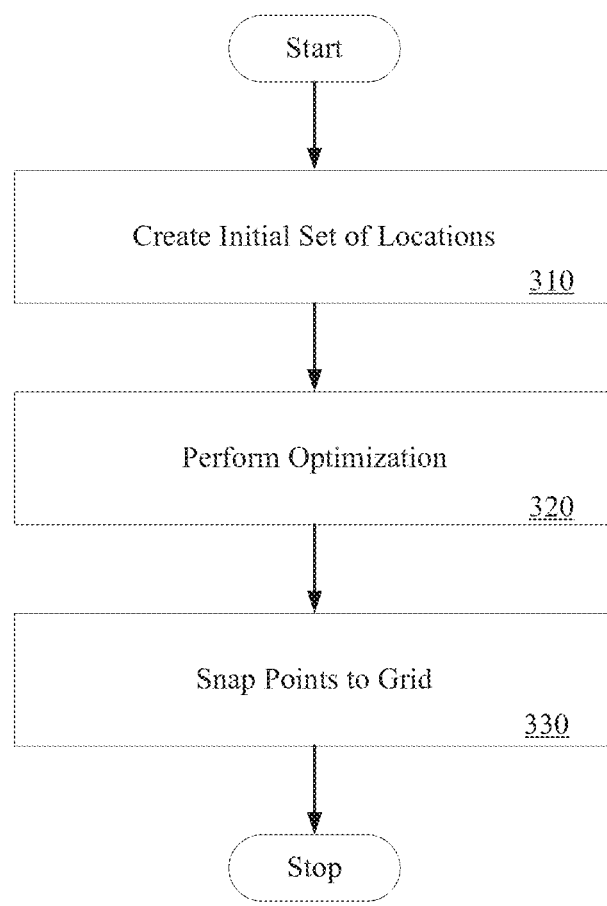
FIG. 3 is a flow diagram illustrating one embodiment of a process generating a halftone seed pattern.

FIG. 3 is a flow diagram illustrating one embodiment of a process for generating a halftone seed pattern. At processing block 310, an initial set of particle locations for a seed pattern is generated. In one embodiment, a random set of particle locations is selected. However, a previously generated seed pattern may be selected for optimization. Examples of this include patterns created by previous optimizations or near perfect packing patterns with added or subtracted particles to match the desired number of particles. At processing block 320, an optimization function is performed using a Riesz energy minimization algorithm in order to generate a disperse set of particle locations.

The concept for Riesz energy minimization is:

$$\text{Energy} = \text{Summation of } 1/r^n \text{ over all distinct pairs of particles,}$$

where r is the Euclidean distances between the two particles in the pair (e.g., $\|(x_1,y_1)-(x_2,y_2)\|$ where $(x_1,y_1)$ and $(x_2,y_2)$ are the coordinates for the location of the two particles in the pair) and n is the value of the exponent.

Typically the value of n is chosen to be a positive number. In one embodiment, n=8 is implemented as the exponent value. However in other embodiments, smaller or larger exponents may be implemented. As n approaches infinity the pattern after optimization will approach the particle distribution generated, for the case where the maximum of minimum pair wise distances is the objective.

Further, the number of particles may be adjusted to avoid perfect geometric patterns that would be created after optimization if for the initial number of particles a hexagonal packing can be achieved. The size of the region may also be adjusted, while keeping the number of particles the same, to also avoid finding perfect or near perfect hexagonal packing for the particles which is the optimal packing depending on the number of particles and region size.

While the number of particles is the natural parameter to create a dispersed pattern the average spacing of the particles is a more relevant parameter for a hybrid halftone design. The number of particles is selected to achieve a particle spacing, and hence a dot spacing in a halftone design, which meets the objectives of the design. This provides some flexibility for the selection of the number of particles.

Figure 4:
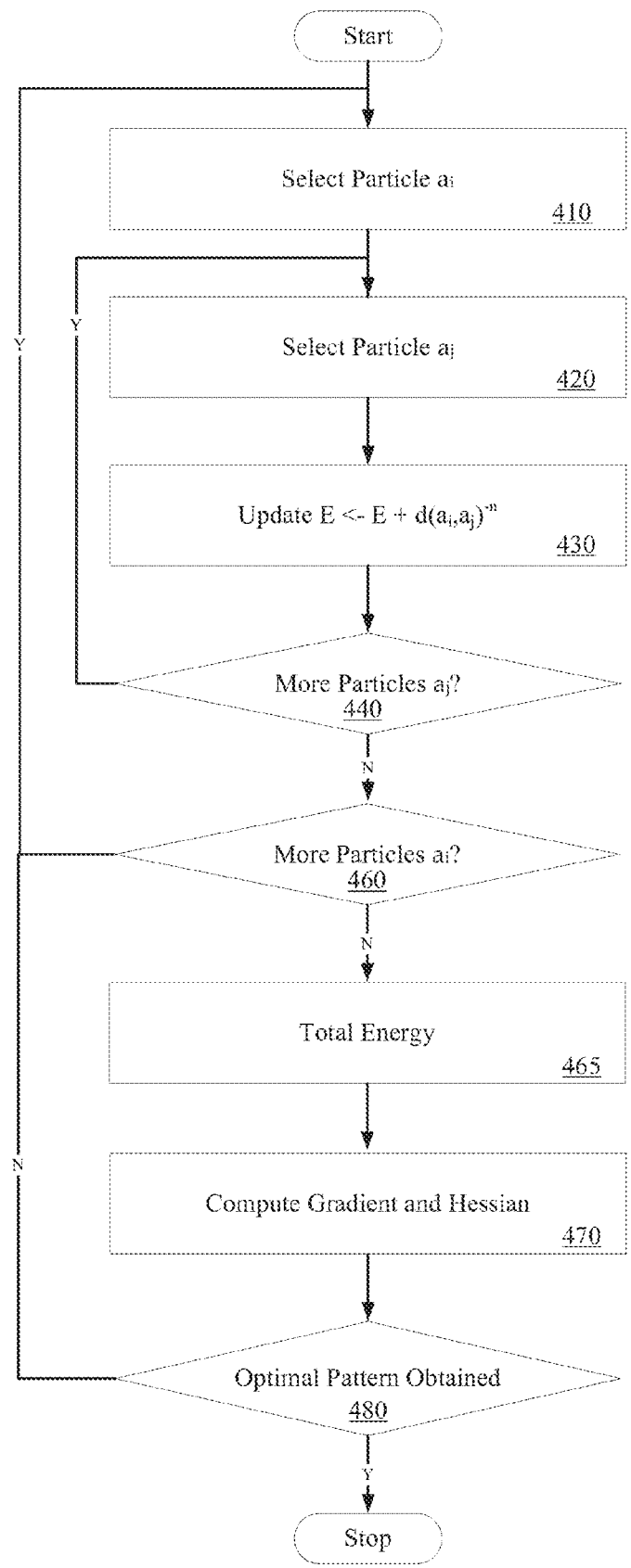
FIG. 4 is a flow diagram illustrating one embodiment of an optimization process.

FIG. 4 is a flow diagram illustrating one embodiment for performing an optimization process. At processing block 410, a first particle location $a_i$ (e.g., $x_1,y_1$) is selected. At processing block 420, another particle location $a_j$ (e.g., $x_2,y_2$) is selected. At processing block 430, a Riesz energy minimization value (E) is updated for points $a_i$ and $a_j$ by adding $d(a_i, a_j)^{-n}$ to the current value of E.

As discussed above, E is computed as the summation of all $d(a_i, a_j)^{-n}$, where $d(a_i, a_j)$ is the distance between particles $a_i$ and $a_j$, and n equals 8. Here i and j are the particle indices that ranges from 1 to the number of total particles with i not equal to j. Thus the pairs of particles $(a_i, a_j)$ traverse all distinct pairs. The energy contribution for each pairs of particles $(a_i, a_j)$ is updated during each iteration by adding $d(a_i, a_j)^{-n}$ to the value of E. This process is repeated for each pairs of particles until all distinct pairs of particles have been used to update the total Riesz energy E. At that point the total energy E is determined as the sum of each of the individual energies $d(a_i, a_j)^{-n}$.

The seed pattern which is generated ultimately is employed in a halftone design which is tiled without offset across the image space. This creates a pattern having "wrap-around" spatial characteristics common to halftone designs. To account for wrap-around, creating the optimum pattern must include "virtual" particles which surround the primary seed pattern space. One embodiment replicates the current particles in all regions surrounding the primary seed pattern being generated.

This requires copies of the current particles to the left, right, diagonally in all four directions, above and below. Optimizing the particle locations considering surrounding versions of the seed pattern produces a final pattern which seamlessly abuts to patterns adjacent to it in all directions so as to avoid artifacts which otherwise would be caused by the discontinuity. The virtual patterns are accounted for in the calculations of the energy for the primary seed space. This is done by assuming the coordinates of the particles to live on a torus manifold, and the distance computation performed on a torus.

At processing block 440, it is determined whether more sets of particles $a_j$ are available for distance computation with $a_i$. If more sets of particles $a_j$ are available, control is returned to processing block 420 where another particle $a_j$ is selected. Subsequently, the value of E is updated. When the set of particles $a_j$ is the set of particles which does not include the last particle $a_i$ processing stops. When this occurs no additional sets of particles $a_j$ are available, at which time a sum is obtained for all of the previous calculations to determine the final value of E as a sum of the distance value over all pairs of distinct particles.

At processing block 460, it is determined whether more particles $a_i$ are available for distance computation. If more particles $a_i$ are available, control is returned to processing block 410 where another particle $a_i$ is selected and processes 420-450 are repeated. This process occurs until total E has been computed for all particles. At processing block 465, all of the $E_i$ Energy values are summed to represent the total energy for the entire system of particles. After the total Energy E has been determined, to facilitate rapid convergence, the gradient and/or Hessian are optionally computed in block 470.

This information is used by the optimization algorithm to most efficiently find the configuration of particles having minimum total E with a minimum number of iterations. Depending on the optimization algorithm used (see for instance the book "Practical Methods of Optimization" by R. Fletcher, Wiley, $2^{nd}$ edition, 2000) gradient or Hessian can be either approximated or computed explicitly.

Explicit computation of gradient and Hessian can be easily derived from the definition of Riesz energy by those skilled in the art as a simple application of product rules in computing derivatives. In terms of Hessian approximation algorithms, well-known algorithms such as quasi-Newton Hessian updates (in particular the BFGS update) may be used (see for instance http://en.wikipedia.org/wiki/Quasi-Newton-_method). Alternatively, a limited memory Hessian such as those described in SIAM J. Optimization, vol. 14, no. 2, pp.

380-401 or http://en.wikipedia.org/wiki/L-BFGS may be implemented to reduce memory usage in storing the Hessian matrix.

At processing block 480, it is determined whether an optimal pattern has been obtained. In one embodiment, an optimal pattern is obtained once the optimization computation has converged according to the convergence criteria of the optimization algorithm (e.g. see above reference text by Fletcher). If the computation has not converged adjustments are made to the locations of the particles to further reduce the total energy of the system of particles, control is returned to processing block 410, where the process is repeated. The process has been completed once the convergence criteria has been met. This occurs when the minimum energy system has been determined.

Figure 5:
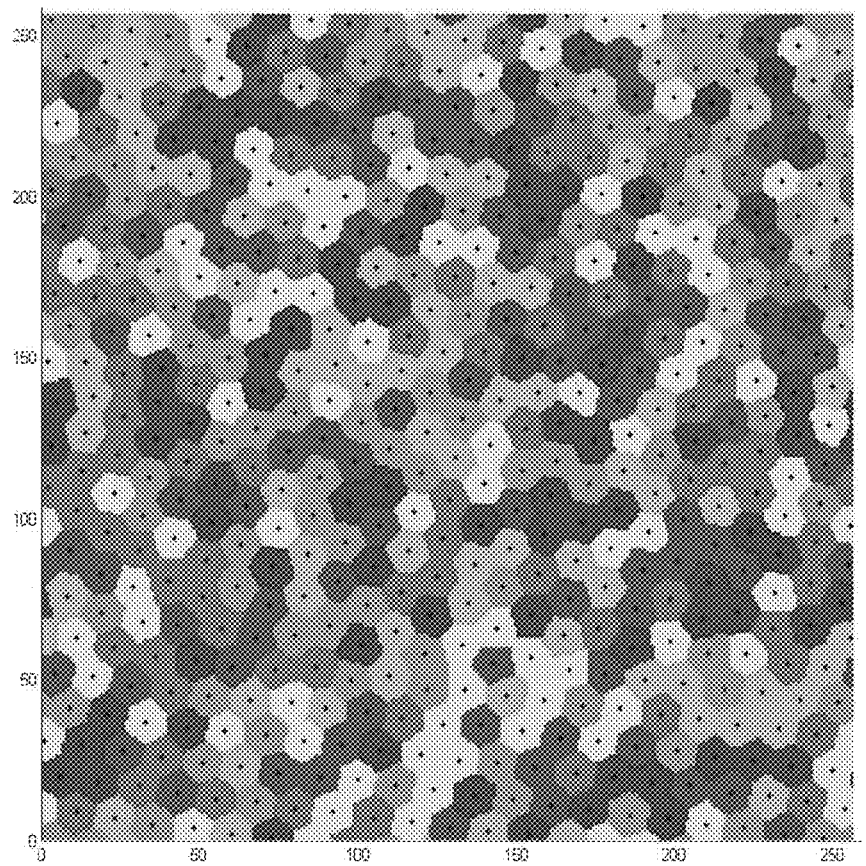
FIG. 5 illustrates one embodiment of a seed pattern.

The optimization process finds the best location of the particles without regard to any halftone grid system. Referring back to FIG. 3, the particle points are snapped to a grid once the optimization has been completed to the point of convergence. This converts the locations to points suitable for a halftone design which must occur at discrete points on a printer grid. However in other embodiments, the points may be used without snapping as dot centers in order to implement a hybrid screen design for the case where the halftone design is multibit, having multiple drop sizes available to render an image. In this case the particle locations are used as centroids of dot centers for hybrid screen designs. FIG. 5 illustrates one embodiment of a seed pattern generated using Riesz energy minimization.

As shown in FIG. 5, the seed pattern is an output of the optimization of 500 dots on a 256×256 grid in which the regions associated with each dot is shown. Regions are defined as the set of PELs having the smallest Euclidean distances to the respective particle for that region (also known as Voronoi regions). The area of each region is defined as the total number of PELs within that region. The above-described method creates patterns having high consistency. This produces very consistent areas for each region associated with each particle, which are visually uniform and pleasing.

In addition, the areas of the various regions are approximately equal to each other. Note that the regions have a "wrap-around" characteristic, where the left edge is a continuation of the right edge and the top edge is a continuation of the bottom edge. This is equivalent to the surface living on the torus manifold and the distance computation are computed on this manifold. Depending on the application, this wrap around requirement is optional.

With reference to FIG. 3, another feature of the invention is that step 330 of snapping the position of the particles to the grid is separate from the optimization step in 320. In general, step 330 is much less computationally intensive than step 320. This allows the invention to be used in the following mode: run step 320 once, and depending on the size of the halftone mask needed, apply the results of step 320 to different size grids during step 330 to quickly generate halftone patterns of different sizes.

Figure 6:
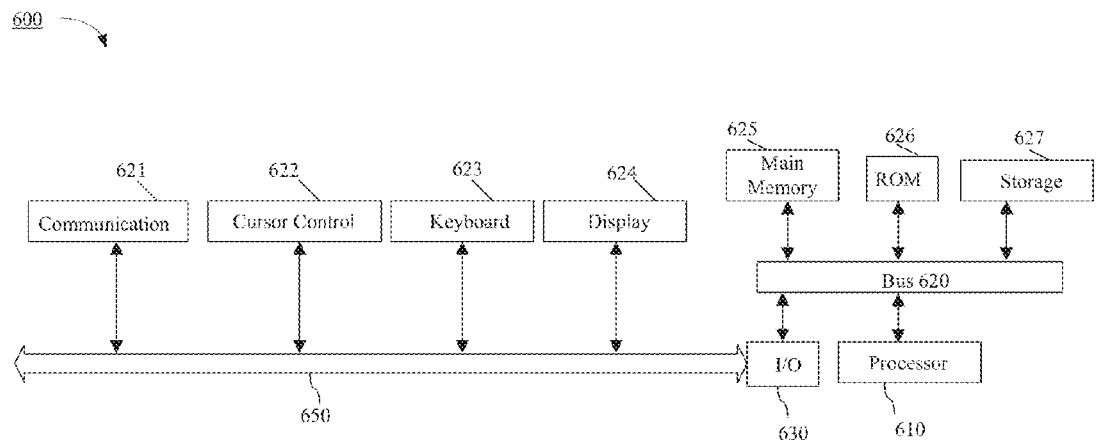
FIG. 6 illustrates one embodiment of a computer system.

FIG. 6 illustrates a computer system 600 on which print controller 140 and/or host system 110 may be implemented. Computer system 600 includes a system bus 620 for communicating information, and a processor 610 coupled to bus 620 for processing information.

Computer system 600 further comprises a random access memory (RAM) or other dynamic storage device 625 (referred to herein as main memory), coupled to bus 620 for storing information and instructions to be executed by processor 610. Main memory 625 also may be used for storing temporary variables or other intermediate information during execution of instructions by processor 610. Computer system 600 also may include a read only memory (ROM) and or other static storage device 626 coupled to bus 620 for storing static information and instructions used by processor 610.

A data storage device 625 such as a magnetic disk or optical disc and its corresponding drive may also be coupled to computer system 600 for storing information and instructions. Computer system 600 can also be coupled to a second I/O bus 650 via an I/O interface 630. A plurality of I/O devices may be coupled to I/O bus 650, including a display device 624, an input device (e.g., an alphanumeric input device 623 and or a cursor control device 622). The communication device 621 is for accessing other computers (servers or clients). The communication device 621 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. An article of manufacture comprising a non-transitory machine-readable medium including data that, when accessed by a machine, cause the machine to perform operations comprising:

generating a set of points via energy minimization to implement halftone seed pattern by performing an optimization function using a Riesz energy minimization algorithm, including:
selecting a first particle location;
selecting a second particle location;
selecting a third particle location;
calculating an energy minimization value for the first and second particle locations; and
calculating an energy minimization value for the first and third particle locations.

2. The article of manufacture of claim 1 wherein the energy minimization value for the first and second particle locations is calculated as an inverse of a distance between the first and second particle locations raised to a power determined by an exponent.

3. The article of manufacture of claim 1 wherein performing the optimization function further comprises adding the calculated energy minimization value for the first and second particle locations and the calculated energy minimization value for the first and third particle locations.

4. The article of manufacture of claim 3 wherein performing gradient and Hessian computations on the added energy minimization values.

5. The article of manufacture of claim 1 comprising a machine-readable medium including data that, when accessed by a machine, further cause the machine to perform operations comprising generating an initial set of particle locations for the seed pattern prior to generating the set of points via energy minimization.

6. The article of manufacture of claim 5 wherein generating the initial set of particle locations for the seed pattern comprises selecting a random set of particle locations.

7. The article of manufacture of claim 1 comprising a machine-readable medium including data that, when accessed by a machine, further cause the machine to perform operations comprising snapping optimized particle points to a grid.

8. An article of manufacture comprising a non-transitory machine-readable medium including data that, when accessed by a machine, cause the machine to perform operations comprising:
   generating an initial set of particle locations for a halftone seed pattern seed pattern by selecting a previously generated seed pattern;
   generating a set of points via energy minimization to by performing an optimization function using a Riesz energy minimization algorithm, including:
   selecting a first particle location;
   selecting a second particle location; and
   calculating an energy minimization value for the first and second particle locations.

9. The article of manufacture of claim 8 comprising a machine-readable medium including data that, when accessed by a machine, further cause the machine to perform operations comprising snapping optimized particle points to a grid.

10. A system comprising:
    a processor to generate a set of points via energy minimization to implement halftone seed pattern by performing an optimization function using a Riesz energy minimization algorithm, including:
    selecting a first particle location;
    selecting a second particle location;
    selecting a third particle location;
    calculating an energy minimization value for the first and second particle locations and
    calculating an energy minimization value for the first and third particle locations.

11. The system of claim 10 wherein the energy minimization value for the first and second particle locations is calculated as an inverse of a distance between the first and second particle locations raised to a power determined by an exponent.

12. The system of claim 10 wherein performing the optimization function further comprises adding the calculated energy minimization value for the first and second particle locations and the calculated energy minimization value for the first and third particle locations.

13. The system of claim 10 wherein the processor further performs gradient and Hessian computations on the added energy minimization values.

14. The system of claim 10 wherein the processor generates an initial set of particle locations for the seed pattern prior to generating the set of points via energy minimization.

15. The system of claim 14 wherein the processor snaps optimized particle points to a grid.

* * * * *